United States Patent
Lundsgaard

(10) Patent No.: US 8,270,304 B2
(45) Date of Patent: Sep. 18, 2012

(54) METHODS AND APPARATUS FOR ACCESS POINT SCANNING IN VOIP SYSTEMS

(75) Inventor: Soren Lundsgaard, Inverness, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 837 days.

(21) Appl. No.: 12/263,269

(22) Filed: Oct. 31, 2008

(65) Prior Publication Data

US 2010/0110949 A1    May 6, 2010

(51) Int. Cl.
*H04L 12/26* (2006.01)
(52) U.S. Cl. ......... 370/241; 370/338
(58) Field of Classification Search .......... 370/338, 370/241
See application file for complete search history.

(56) References Cited

U.S. PATENT DOCUMENTS

| | | | |
|---|---|---|---|
| 2004/0151137 | A1 | 8/2004 | McFarland et al. |
| 2004/0214539 | A1* | 10/2004 | Rajamani et al. ......... 455/161.1 |
| 2005/0036469 | A1* | 2/2005 | Wentink ................ 370/338 |
| 2005/0068928 | A1 | 3/2005 | Smith et al. |
| 2006/0142034 | A1 | 6/2006 | Wentink et al. |
| 2007/0275756 | A1* | 11/2007 | Choi ............................ 455/557 |

OTHER PUBLICATIONS

International Search Report, dated Jan. 11, 2010, for PCT Application No. PCT/US2009/059543.
IEEE, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Computer Society, Standard 802, Jun. 12, 2007, pp. 1-1184, Piscataway, NJ, USA.
Etsi, "Broadband Radio Access Networks (BRAN); 5 GHz high performance RLAN; Harmonized EN covering the essential requirements of article 3.2 of the R&TTE Directive; Final draft ETSI EN 301 893", European Telecommunications Standards Institute (ETSI), Aug. 1, 2008, pp. 1-67, vol. BR, No. V1.5.1, Sophia Antipolis Cedex, France.
International Preliminary Report on Patentability for International Application No. PCT/US2009/059543 mailed on May 12, 2011.

* cited by examiner

*Primary Examiner* — Kevin C Harper

(57) ABSTRACT

A system is configured to scan for APs on DFS channels while maintaining VOIP traffic employing both passive and active scans. During passive scan mode, the APs are configured to listen only. During active scan mode, the STA sends a probe request, and the AP(s) send(s) probe responses. During power save mode, the STA tells the associated AP that it will be turning "off" to save power. The STA is then required to listen to beacons for traffic notifications. The power save mode enables the STA to move to other channels during periods in which the AP "thinks" it is asleep. An 802.11 "in-use" list is used to facilitate scanning.

10 Claims, 5 Drawing Sheets

METHODS AND APPARATUS FOR ACCESS POINT SCANNING IN VOIP SYSTEMS

TECHNICAL FIELD

The present invention relates generally to components used in connection with radio frequency identification (RFID) systems, wireless local area networks (WLANs), and other such networks, and, more particularly, to methods of deploying devices in such networks.

BACKGROUND

Wireless local area networks (WLANs), such as those conforming to the IEEE 802.11 family of standards, have become pervasive in recent years, and are increasingly used for both data communication and voice-over-IP (VOIP) communication. Such wireless networks operate in various frequency bands, including bands in the 5 GHz region that are popularly called DFS bands.

Applicable regulations require that, on DFS bands, if a mobile device hears a radar on its frequency, it must vacate the frequency in a given amount of time (generally about 10 seconds) and must remain off of the frequency for a certain length of time (approximately 30 minutes). Furthermore, no device can transmit on the frequency until it learns that no radar is present on that frequency. The applicable regulations allow slave devices that are enabled to transmit on the frequency by master devices. The master devices then assume responsibility for listening for radar and informing slave devices that they must switch to a frequency that has no radar interference.

In accordance with 802.11, the method that master devices (i.e., access points) use to enable slave devices utilizes the beacon. If there is no channel switch announcement present in the beacon, then the slave device can transmit on the channel. When the access point adds the channel switch announcement to the beacon, then the mobile device cannot subsequently transmit on that frequency.

If a device is engaging in a voice call, perhaps using G711 to encode voice packets, the device transmits a voice packet to the access point every 20 ms, and then polls the access point and receives back from the AP a G711 voice packet. The traditional method for learning about an access point on a DFS frequency is to listen for a duration no greater than the beacon interval (100 ms) on that frequency. If the device leaves the frequency of the access point to which it is currently associated and transfers to a DFS channel to listen for an (unknown) access point, it is likely that up to five voice packets will be delayed in being transmitted to the access point, and up to five voice packets will be delayed from reception from the access point. This is highly undesirable, as it results in, among other things, poor voice quality.

Accordingly, it is desirable to provide improved methods and systems for passive scanning in WLANs. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention generally relates to systems and methods that provide scanning of access points in the context of 802.11h communications while maintaining voice-over-IP (VOIP) traffic. In general, the system treats the beacon interval as a repeating loop, splitting that loop into discrete slices, and listening to each slice. Although it is not known a priori where (i.e., in which slice) the beacon will appear, if it does appear, it will stay in the same slice. Working through the slices, the system will eventually find the beacon. Meanwhile, voice calls can proceed as normal, as the system has not delayed voice packet transmission or reception by more than a few milliseconds.

In this regard, the following detailed description is merely illustrative in nature and is not intended to limit the invention or the application and uses of the invention. Furthermore, there is no intention to be bound by any express or implied theory presented in the preceding technical field, background, brief summary, or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, VOIP, the 802.11 family of specifications, wireless networks, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

Figure 1:
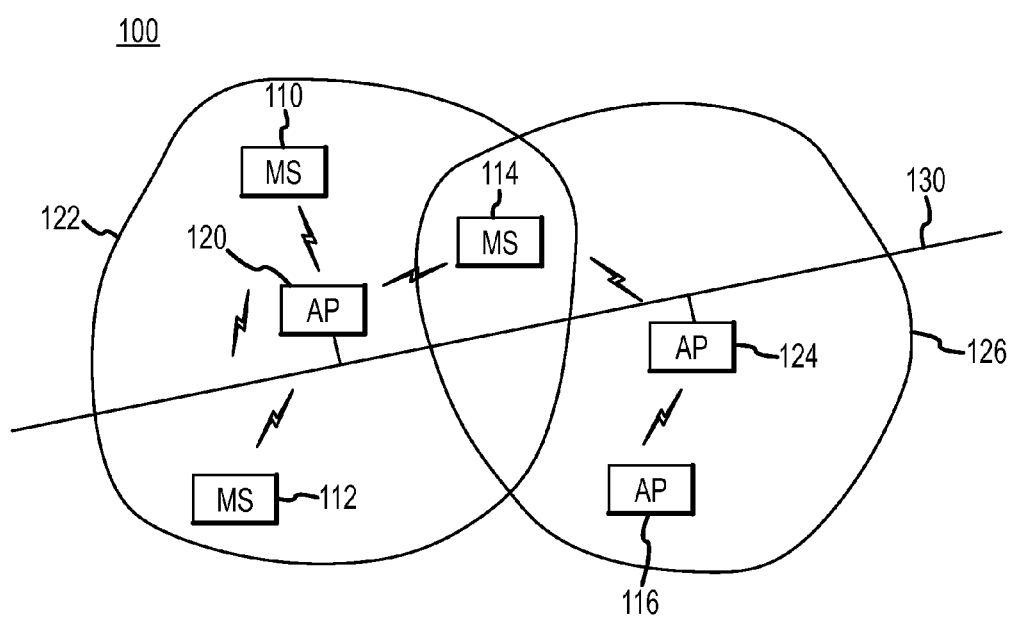
FIG. 1 is a conceptual overview of a system in accordance with an exemplary embodiment of the present invention.

FIG. 1 depicts a wireless local area network (WLAN) 100 useful in illustrating one embodiment of the present invention. In general, WLAN 100 includes one or more wireless communication devices, also referred to as "mobile stations" or "STA," 110, 112, 114 and 116, and one or more access points 120 and 124. Access points 120 and 124 may be connected to a network 130, which in turn may be connected to other wired and wireless networks (not shown). Mobile stations 110, 112, 114 and 116 include radio transmitters and receivers for transmitting and receiving signals such as voice over IP, data packets, control frames, and network management frames. Mobile stations 110, 112, 114 and 116 can communicate wirelessly with access points 120 and 124, and can be set to communicate with each other. In one embodiment, two mobile stations 110 and 112 form an ad hoc network with the ability to establish communications when in close proximity to each other.

Often, one or more mobile stations 110, 112 and 114 will connect wirelessly to an access point 120, using standardized protocols such as IEEE 802.11, commonly referred to as Wi-Fi. These industry standards allow communication channels to be established and maintained between combinations of mobile stations and access points for the transmission of digital information by using techniques such as carrier-sense multiple access protocol with collision avoidance (CSMA/CA) to help provide rapid, equitable connectivity for all stations.

A mobile station may be within range of more than one access point. For example, mobile station 114 may be connected to (associated with) either access point 120 or access point 124, with one of the access points 120, 124 acting as the serving AP while the other is what can be referred to as a neighboring AP. As mobile station 114 moves or roams, or as environmental conditions for radio transmissions change, the serving AP may be changed accordingly.

Access point 120 has a transmission range 122 within which data transmissions can be sent to and received from one or more mobile stations 110, 112, and 114. Similarly, access point 124 has a transmission range 126 within which data transmissions can be sent to and received from one or more mobile stations 114 and 116.

An AP generally transmits a beacon signal (or simply "beacon") on a prescribed channel. The prescribed channel comprises a prescribed frequency or frequency band that can be received by any mobile station within the transmission range when the mobile station is appropriately tuned and ready to receive the transmission. The beacon signal includes, for example, an access-point timestamp, a beacon interval, a basic service set identifier (BSSID), and a traffic indication map (TIM). The access-point timestamp contains timer information from the serving AP such as a copy of the AP's TSF timer to be used for synchronizing time-sensitive operations.

The beacon interval indicates the time between two targeted start times of a beacon signal. Per the 802.11 standard, 1024 microseconds is referred to as a "time unit" (TU), and the beacon interval is a fixed multiple of TUs. In one embodiment, (typical practice) the beacon interval is 100 TUs. Because of the small difference in time between 1 TU and 1 ms, in the context of 802.11, timing numbers are often described in ms, when the author really means TUs. This notational shortcut is followed herein.

The SSID is an identifying name assigned to the local network comprising the mobile stations and the APs serving the mobile stations. A BSS is a basic service set that includes a set of stations controlled by a single coordination function. The BSSID in an infrastructure BSS is the MAC address of the serving AP. The traffic indication map, an information element present within beacon frames generated by APs, contains a DTIM count that indicates how many beacons will appear before the next DTIM, a DTIM period indicating the number of beacon intervals between successive DTIMs, a bitmap control field that provides an indication of broadcast or multicast frames buffered at the AP, and a traffic-indication virtual bitmap containing information corresponding to traffic buffered for a specific station within the BSS that the AP is prepared to deliver at the time the beacon frame is transmitted.

The DTIM is a beacon signal that contains a delivery traffic information message (DTIM) after which an AP sends out buffered broadcast and multicast media access control (MAC) service data units (MSDU), followed by any unicast frames. The beacon signal may also include within the beacon frame fields containing information such as capability information, supported rates, and parameters related to frequency hopping (FH) or direct sequence spread spectrum (DSSS) physical layers (PHYs). Frequency of communication may be determined via Dynamic Frequency Selection (DFS).

Upon association of the various stations with their respective APs, data communication as well as voice-over IP (VOIP) traffic is suitably routed from, to, and between the various APs, stations, and network 130 within WLAN 100.

Generally, in accordance with various aspects of the present invention, the system is configured to scan for APs on DFS channels while maintaining VOIP traffic employing both passive and active scans. During passive scan mode, the APs are configured to listen only. During active scan mode, the STA sends a probe request, and the AP(s) send(s) probe responses. During power save mode, the STA tells the associated AP that it will be turning "off" to save power. The STA is then required to listen to beacons for traffic notifications. The power save mode enables the STA to move to other channels during periods in which the AP "thinks" it is asleep.

The system incorporates and defines a list referred to as the "in-use 802.11h channel list" (or simply "in-use list"). The in-use channel list includes a description of the channel (usually the channel number) and time of last traffic reception on this channel according to the device's clock. The system also includes a more general list referred to as the "802.11h channel list" or "main channel list." This list reflects the list of channels affected by the DFS regulations in effect.

References to scan interval start and stop times below are relative to (after) the most recent expiration of a periodic device timer called the interval timer, which has a period equal to the beacon interval. Every AP that the device is capable of hearing shall have a beacon interval that is equal to the period of the interval timer.

Figure 2:
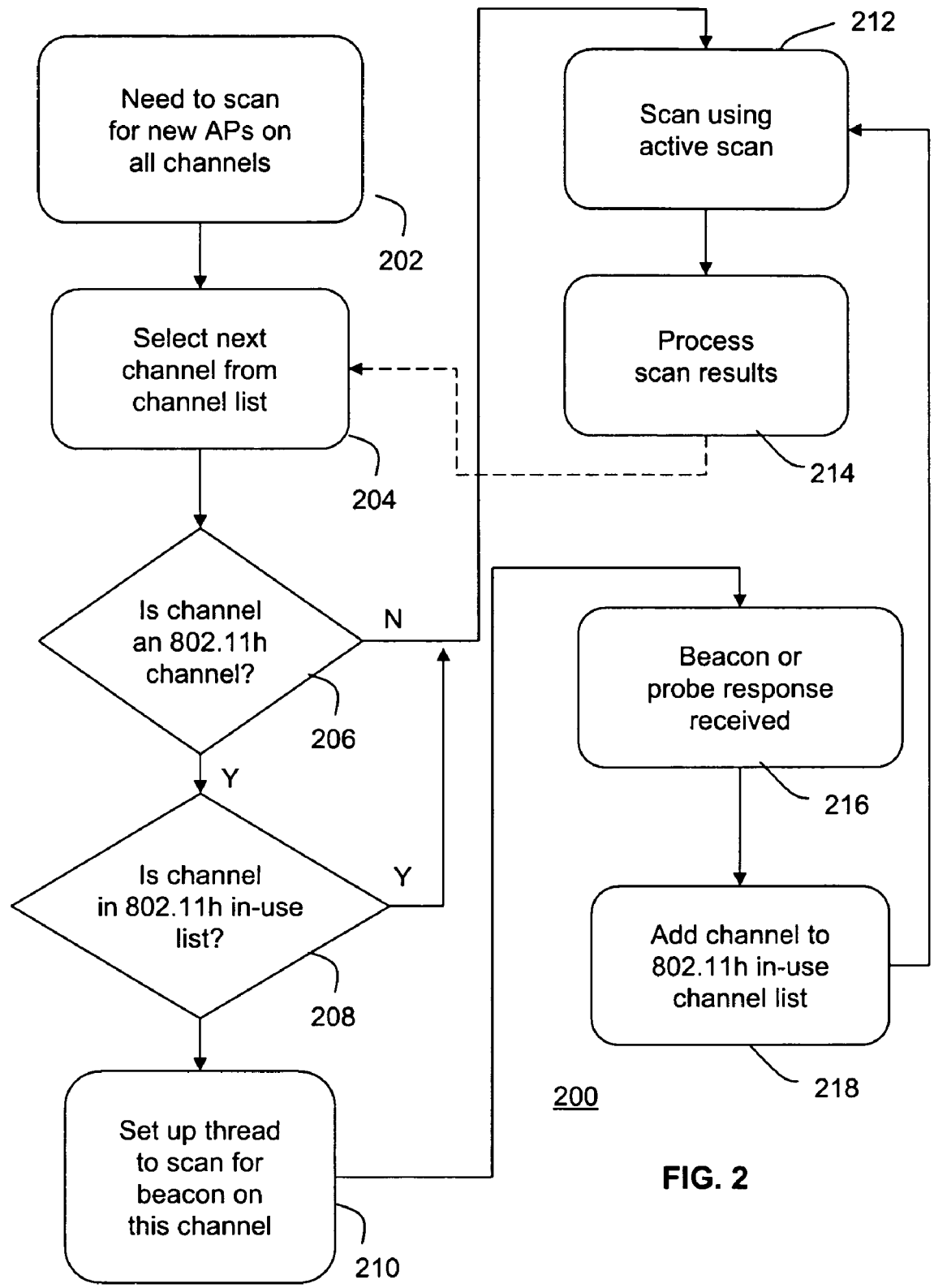
FIGS. 2-5 depict flowcharts in accordance with one embodiment of the present invention.

Referring to the exemplary method 200 shown in FIG. 2, the system first scans for new APs on all channels (202). It selects the "next" channel from a channel list (204), then determines whether that channel is an 802.11h channel (206). If not, the system continues to step 212; if so, the system determines whether the channel is a member of the in-use list (208). If it is, a thread is set up to scan for beacons on this channel (210), and the method continues at step 212, where scanning is accomplished using an active scan. The results of the scan are then processed (214), and the process continues again from step 204 if the channel list has not been exhausted.

Figure 3:
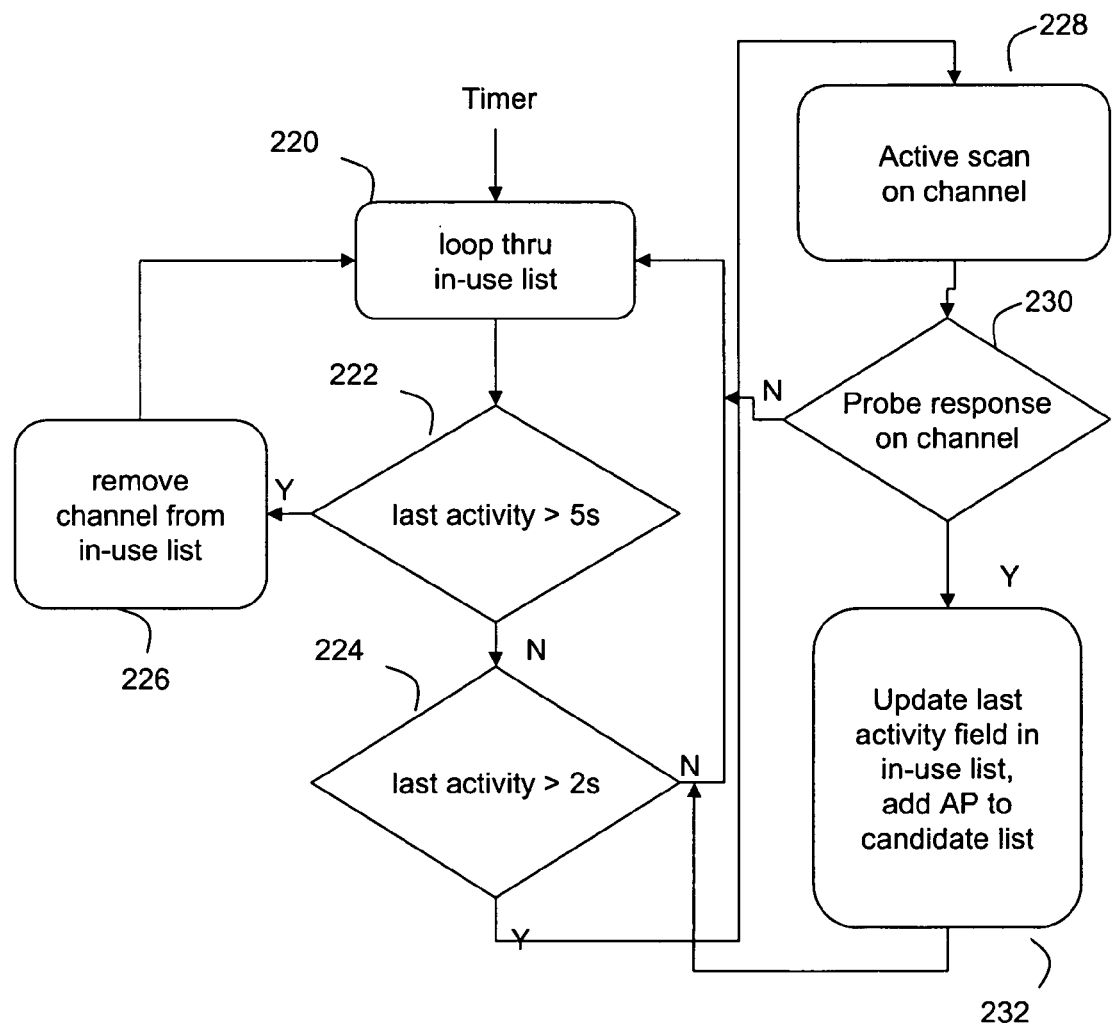

Referring to FIG. 3, driven by a timer, the system loops through the in-use list (220). First, it determines whether the last activity occurred greater than a prior predetermined time (e.g., 5.0 seconds prior) (222). If so, that channel is removed from the in-use list (226); if not, the system determines whether the last activity occurred greater than, for example, 2.0 seconds prior (224). If the last activity did not occur greater than 2.0 seconds prior, then the system continues again with step 220 and loops through the in-use list. If the last activity was greater than 2.0 seconds, the system performs an active scan on the channel (228), waits for a probe response on the channel (230), and updates the last in-use list while adding the AP to a candidate list (232). If no probe response is received, the system again continues at step 220, and loops through the in-use list. The 5.0 seconds used in this example may be any suitable time,—e.g., any time that is less than time required by applicable standards (e.g., less than 10 seconds).

Figure 4:
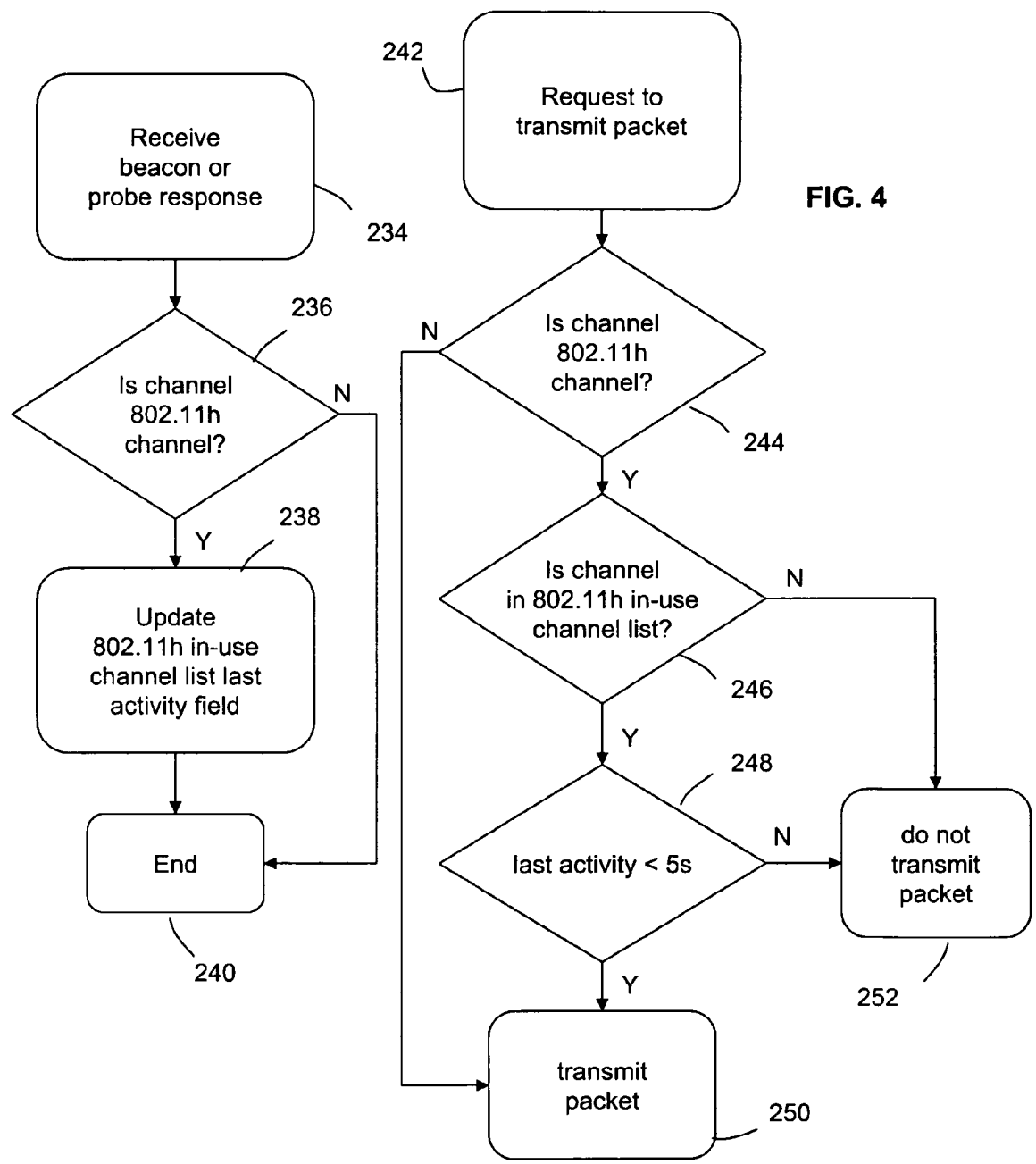

Referring to FIG. 4, if the device hears a probe response or beacon activity (234), the system determines whether the channel is a 802.11h channel (236) and a channel switch announcement is not present in this activity, the device adds this channel to or updates the channel information on the in-use channel list, including the time at which the beacon was received (238).

If a request to transmit a packet is received (242), the system first determines whether the channel is an 802.11h channel (244). If not, the packet is transmitted (250); if so, the system determines whether the channel is on the in-use list (246) and last activity is less than, for example, 5.0 seconds prior (248). If both conditions are met, the packet is transmitted (250); otherwise, the packet is not transmitted (252).

Figure 5:
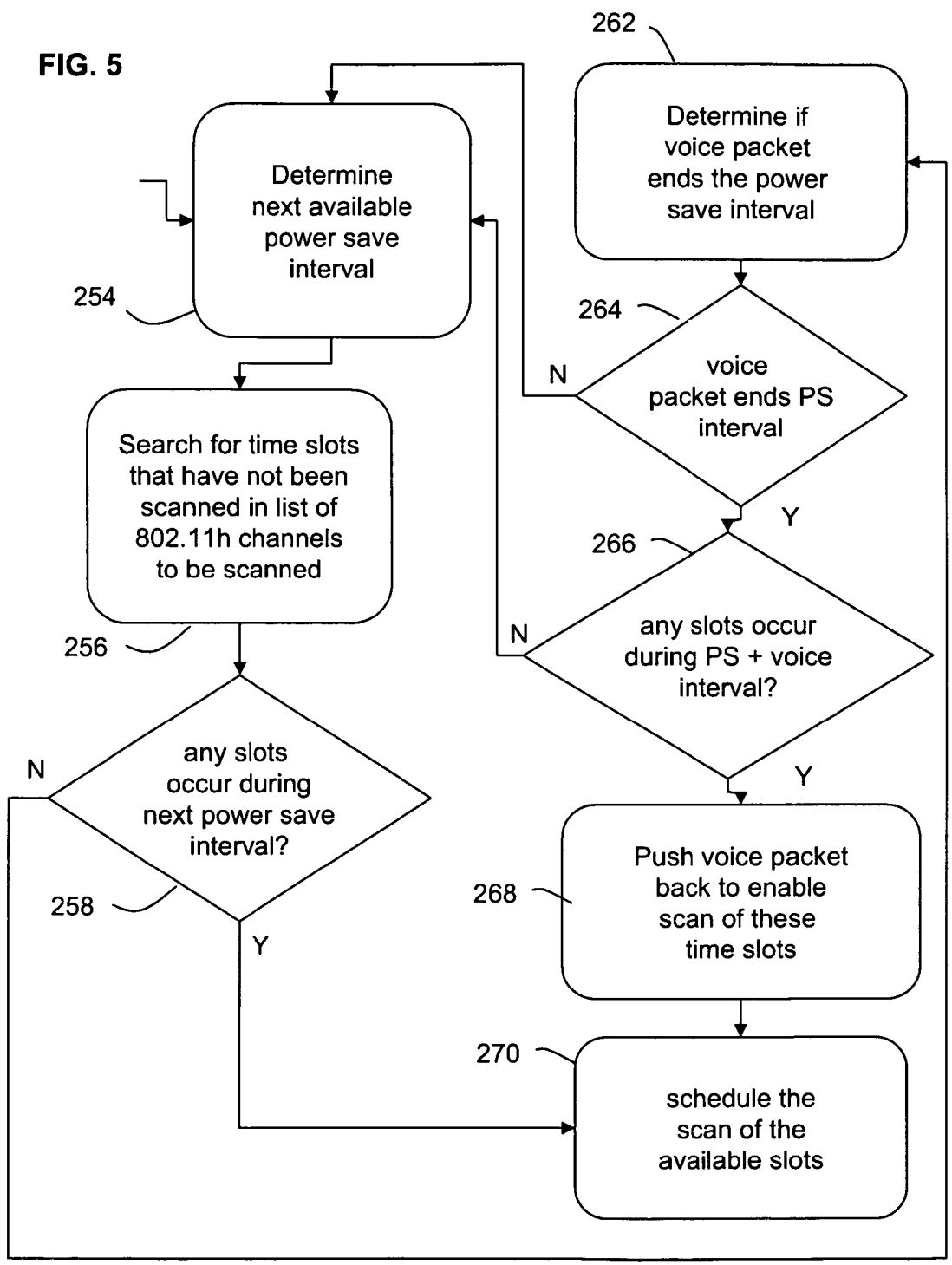

Referring to FIG. 5, driven by a timer, the system determines the next available power save interval (254). First, a search is made of the time slots that have not been scanned in list of 802.11h channels to be scanned (256). If any slots occur during the next power save interval (258), the system schedules the scan of available slots (270); if not, then the system continues at step 262 and determines whether a voice packet ends the power save interval (264). If not, the procedure returns to step 254. If power save is ended by a voice packet, the system determines whether any slots occur during a PS+voice interval (266). If so, the voice packet is pushed back to enable scan of the time slots (268), and a scan of available slots is scheduled (270). If no slots occur during the PS+voice interval, the procedure returns to step 254.

Further expanding upon the exemplary method described and illustrated in FIGS. 2-5, if a device receives a beacon with a neighbor list (via either CCX, 802.11k, or other suitable methods), and an element of that list is an AP on a channel in the 802.11h channel list, but not in the in-use channel list, and a field of the neighbor list element is a TSFtime for the neighbor AP, the device may listen for the neighbor AP's beacon (using the TSFtime to schedule a SPS to save battery). If a beacon is heard from the neighbor, the channel is added to the in-use 802.11h channel list, including the time at which the beacon was received.

For 802.11h channels in the 802.11h channel list that are not in the in-use 802.11h channel list, if traffic is present that does not allow the device to listen on the channel for the full beacon interval, the system may split the 100 ms beacon interval into 25 5.0-ms long scan intervals numbered 0-24, and listen for 5.0 ms on each of these scan intervals (i.e., with 1.0 ms overlap) during times where the other traffic on the device allows these small scan intervals to be monitored, for example: 0 . . . 5 ms after the interval timer, (interval 0), 32 . . . 37 ms after the interval timer (interval 8), (4*n) . . . (4*n)+5 ms after the interval timer (interval n). The overlap is suitably used to cover variations in timing and variability in beacon transmission between the different devices. Generally, any reasonable number of intervals m can be chosen. The length of scan l is then the beacon interval divided by the number of intervals m, and the scans start at time 0, 1, 2*1, 3*1 . . . m and each interval is l+1 ms long.

The above scheme will require that scheduling of SPSs be done by a new routine, keeping track of where voice traffic, other traffic, and other scans are required, so that the device listens during all 25 scan intervals on the channel. If any probe response or beacon is heard during this set of scans, then the channel is added to the in-use 802.11h channel list, including the time at which the probe response or beacon was received. Because the channel is then on the in-use channel list, the device need not schedule any more scan intervals on that channel. After the device has listened during all 25 scan intervals, if no probe response or beacons were received in any of the 25 intervals, the device determines a new start time for the scan of the channel.

If a channel switch announcement is heard from a beacon on the channel, then the appropriate procedures are completed for any APs tracked on that channel, and the channel is removed from the in-use 802.11h channel list. The channel may also be added to a quiet list, in which case no scans are scheduled on channels in the quiet list.

The device schedules periodic passive scans of one AP on each channel of the in-use 802.11h channel list in order to retain APs on the list. If the current AP is at risk of going out of range, as mentioned previously, the device can schedule an active scan of the channel in order to find an AP with less likelihood to go out of range that the device can track to maintain the channel on the in-use 802.11h channel list.

If the scanning algorithm used by the device is designed such that in certain conditions it chooses to shorten or truncate the list of APs it is monitoring in order to save power, it retains one AP from each in-use 802.11h channel list and listens to beacons from that AP at least every 5 seconds in order to keep the channel in the in-use 802.11h channel list.

Once a channel is in the in-use 802.11h channel list, it can be treated the same as a non-802.11h channel: The device can send probe requests on the channel, and it can connect to any suitable AP it finds on the channel. That is, once the enabling signal is received, the mobile device is allowed to use the channel in any manner permitted on a non-802.11h channel.

In accordance with one variation of the above, scan intervals can be joined (to eliminate the overlap) or, similarly, variable length intervals can be used, which is the same as joining intervals, except that the number of intervals approaches the number of ms in the beacon interval. For example, in the situation where 25 5 ms intervals are used to cover the 100 ms beacon interval, the scheduler may find a point where 2 intervals can be joined because no traffic is planned for 9 ms, and this 9 ms matches two unscanned intervals (for example, intervals 18 and 19). So the device starts listening on the channel starting at 72 ms and stops listening at 81 ms.

Any computer program code provided for passive scanning may reside within any suitable computer usable a medium such as read-only memory, random access memory, internal memory, external memory, flash memory, semiconductor memory, magnetic media, optical memory, compact discs, or a combination thereof.

While the present invention is described in the context of IEEE 802.11 family of standards, the invention is not so limited, and may be used in connection with any products that use frequency bands subject to the regulations cited in the Background section.

It should be appreciated that the example embodiment or embodiments described herein are not intended to limit the scope, applicability, or configuration of the invention in any way. For example, these methods may be used in connection with standard barcode readers and the like. In general, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for data and voice communication in a wireless local area network (WLAN) of the type including one or more access points and one or more mobile devices, the method comprising:
   determining a main channel list associated with the plurality of access points and plurality of mobile devices; and
   determining an in-use channel list that is a subset of the main channel list;
   wherein, during a passive scan mode, the access points listen for beacons or probe responses;
   wherein, during an active scan mode, the mobile devices send probe requests, and the access points send back probe responses; and
   wherein, during a power save mode, the mobile devices instruct an associated one of the access points that it is entering a power save mode, during which the mobile device listens for beacons and may move to other channels;
   wherein the APs and mobile devices may associate and provide data and voice communication over channels within the in-use channel list;
   wherein the active scanning mode is configured to take place simultaneously with voice communication over a channel within the in-use channel list; and
   wherein the in-use channel list is an 802.11h in-use channel list.

2. The method of claim 1, wherein the channel list includes a plurality of dynamic frequency selection (DFS) channels.

3. The method of claim 2, wherein the DFS channels are subject to use restrictions under a predetermined set of conditions.

4. The method of claim 3, wherein the predetermined set of conditions comprises the existence of radar on one or more of the DFS channels.

5. A wireless local area network (WLAN) system comprising:
   a plurality of access points coupled to the network and configured to listen for beacons or probe responses when in a passive scanning mode, and to send back probe responses in an active scanning mode;
   a plurality of mobile devices coupled to the network and configured to send probe requests during the active scanning mode, wherein each mobile device is configured to instruct an associated one of the access points that it is entering a power save mode, during which the mobile device listens for beacons and may move to other channels;
   a main channel list associated with the plurality of access points and the plurality of mobile devices, and
   an in-use channel list that is a subset of the main channel list;
   wherein, during a power save mode, the access points and mobile devices may associate and provide data and voice communication over channels within the in-use channel list; wherein the active scanning mode is configured to take place simultaneously with voice communication over a channel within the in-use channel list; and
   wherein the in-use channel list is an 802.11h in-use channel list.

6. The system of claim 5, wherein the channel list includes a plurality of dynamic frequency selection (DFS) channels.

7. The system of claim 5, wherein the DFS channels are subject to use restrictions under a predetermined set of conditions.

8. The system of claim 7, wherein the predetermined set of conditions comprises the existence of radar on one or more of the DFS channels.

9. The method of claim 1, wherein, during the passive scan mode, the access points listen for the beacons or probe responses during subsegments of a DTIM interval.

10. The system of claim 5, wherein, during the passive scan mode, the access points listen for the beacons or probe responses during subsegments of a DTIM interval.

* * * * *